(12) United States Patent
Hori et al.

(10) Patent No.: US 6,381,525 B1
(45) Date of Patent: Apr. 30, 2002

(54) ELECTRIC POWER STEERING APPARATUS (75) Inventors: Yasuaki Hori, Hyogo; Katsuya Ikemoto, Tokyo, both of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/611,131

(22) Filed: Jul. 6, 2000

(30) Foreign Application Priority Data

Jan. 18, 2000 (JP) ........................................ 2000-009074

(51) Int. Cl.⁷ ................................................. G06F 7/00
(52) U.S. Cl. ........................................ 701/41; 180/446
(58) Field of Search ..................... 701/41, 42; 180/168, 180/446

(56) References Cited

U.S. PATENT DOCUMENTS 5,934,407 A * 8/1999 Shimizu et al. .............. 180/446
6,170,600 B1 * 1/2001 Shimizu ..................... 180/446

FOREIGN PATENT DOCUMENTS

JP          8-72736         3/1996

* cited by examiner

*Primary Examiner*—Tan Nguyen
*Assistant Examiner*—Edward Pipala
(74) *Attorney, Agent, or Firm*—Sughrue Mion PLLC (57) ABSTRACT

To provide an electric power steering apparatus that is superior in operationability and reliability and is capable of keeping stable steering feeling by automatically compensating the torque reference value. The electric power steering apparatus is provided with a steering torque detecting Mmeans 11 for detecting a steering torque to be applied to a steering system of a vehicle, a vehicle velocity detecting Mmeans 12 for detecting a vehicle velocity of the vehicle, a curvature radius calculation Mmeans 13 for calculating a radius of curvature of a road along which the vehicle travels, a torque reference value storage Mmeans 15 for storing a torque reference value of the steering torque, a torque compensation Mmeans 14 for compensating the torque reference value of the steering torque on the basis of the steering torque detected by the steering torque detecting Mmeans 11 in response to the detected vehicle velocity and the detected radius of curvature, a compensation controlling Mmeans 16 for calculating an inferential steering torque on the basis of the torque reference value obtained by the torque compensation Mmeans 14 and the detected steering torque, and a target current setting Mmeans 17 for setting a target current on the basis of the vehicle velocity and the inferential steering torque.

6 Claims, 5 Drawing Sheets

ELECTRIC POWER STEERING APPARATUS

BACKGROUND OF THE INVENTION

Field of the Invention

The present invention relates to an electric power steering apparatus in which a power of an electric motor works directly on a steering system as a steering assist power to thereby reducing the steering power of a driver, and more particularly to an electric power steering apparatus for automatically compensating a torque reference value of a torque sensor.

A conventional electric power steering apparatus is known in which a target current is set on the basis of a steering torque detected by a steering torque sensor, an electric motor is driven with an electric motor voltage in correspondence with this target current, the electric motor current that flows through the electric motor is detected, a negative feedback (NFB) is applied to the electric motor, the electric motor voltage is controlled on the basis of a deviation signal of the target current and the electric motor current so that the electric motor is driven with the electric motor current that is equal to the target current, and the steering assist power works on the steering system.

Figure 6:
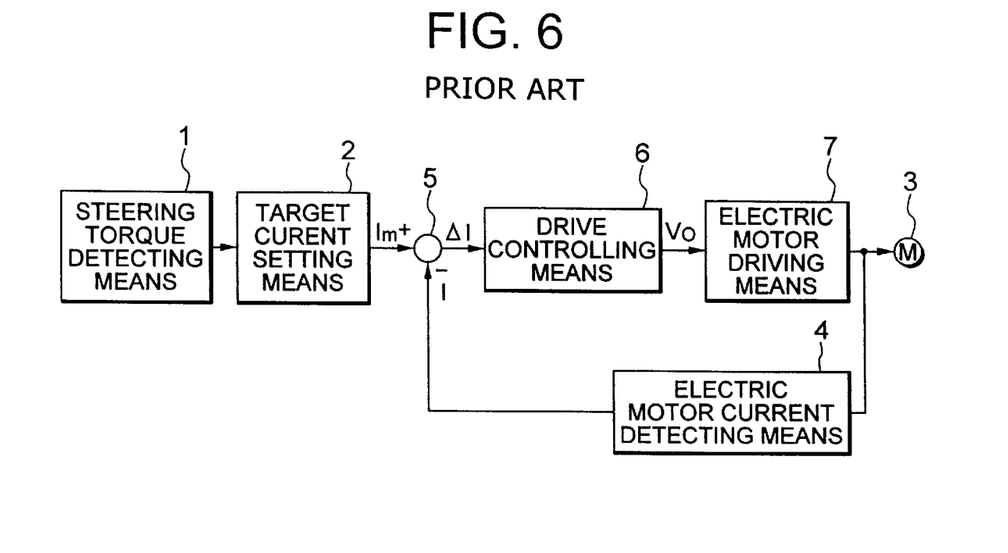
FIG. 6 is a structural diagram showing a conventional electric power steering apparatus.

FIG. 6 is a structural diagram showing this kind of conventional electric power steering apparatus.

Figure 7:
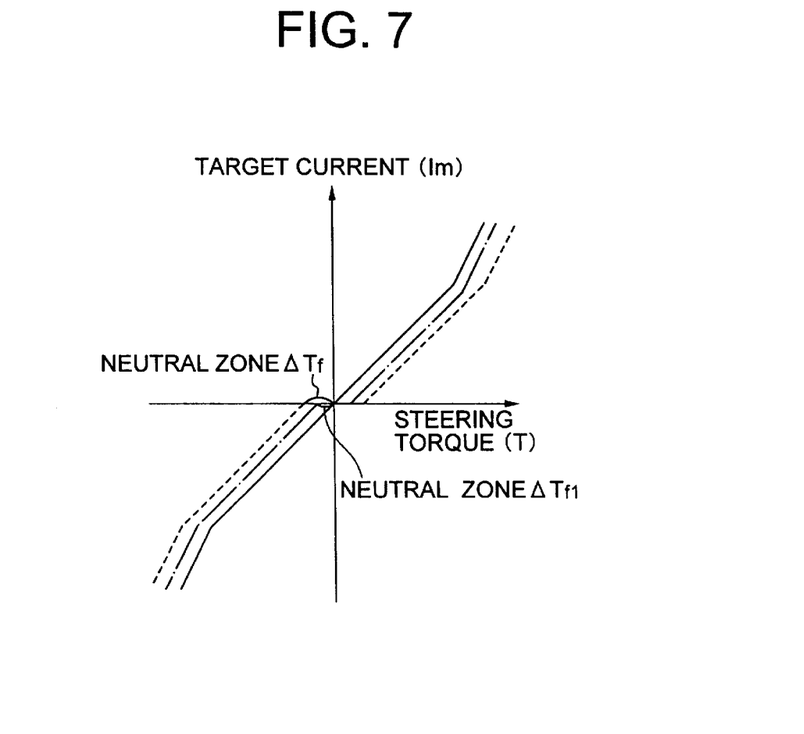
FIG. 7 is a graph showing the characteristics between the steering torque T and the target current Im.

FIG. 6, the electric power steering apparatus is provided with a steering detecting means (steering torque sensor) 1, a target current setting means 2 for setting a target current Im using the characteristic relationship between the steering torque T and the target current Im shown in FIG. 7 on the basis of the steering torque T from the steering torque detecting means 1, an electric motor current detecting means 4 for detecting the current that flows through an electric motor 3, a deviation determining means 5 for calculating a deviation signal ΔI between the target current Im and the electric motor current I detected by the electric motor current detecting means 4, and a drive controlling means for converting the deviation signal ΔI into the voltage and for PWM controlling an electric motor drive means 7 to generate an electric motor controlling voltage V0 for quickly converging the deviation signal ΔI to zero.

The electric motor drive means 7 is composed of, for example, a bridge circuit using four switching elements such as power FETs (Field Effect Transistors) and each of paired power FETs ( every two FETs constitute one pair) is controlled and driven with an electric motor controlling voltage V0 composed of a PWM control signal and a switch, ON/OFF signal fed from the drive controlling means 6 so that the voltage value and the polarity of the electric motor voltage V to be fed to the electric motor 3. Incidentally, the polarity of the electric motor voltage V is determined by controlling each of the two pairs of power FETs at the electric motor voltage V0 outputted from the drive controlling means 6.

Thus, in the conventional electric power steering apparatus, the feedback loop of the electric motor detecting current I is provided to thereby control the deviation signal ΔI between the target current Im and the electric motor detecting current I. Therefore, in either case where the steering direction is in the clockwise direction or in the counterclockwise direction, the deviation signal Δ is converged into zero so that the electric motor current I quickly becomes the target current Im.

Also, the steering torque sensor of the conventional electric power steering apparatus is known which is composed of a potentiometer and a differential amplifier. The steering torque is detected in terms of a corresponding potential change of the potentiometer. This change is converted into an electric signal and is detected as the steering torque signal.

Figure 8:
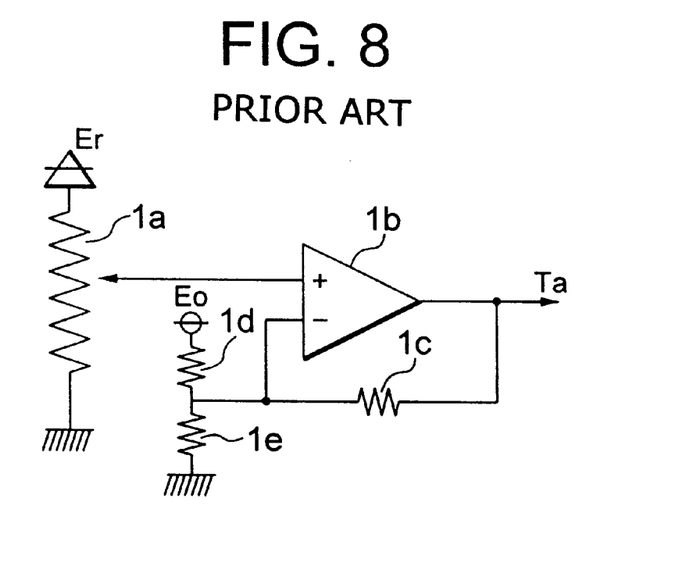
FIG. 8 is a structural diagram showing an example of a steering torque detecting means of an electric power steering apparatus.

FIG. 8 shows a specific circuit structure of the steering torque detecting means 1 shown in FIG. 6. The steering torque detecting means 1 is composed of a potentiometer 1a connected between a power source terminal Er and the ground, a differential amplifier 1b whose non-inverted input terminal is connected to a slide terminal of this potentiometer 1a, a resistor 1c connected between an output terminal of this differential amplifier 1b and the inverted input terminal, and partial voltage resistors 1d and 1e connected between a power source terminal Eo and the ground. The connection point between the partial voltage resistors 1d and 1e is connected to the inverted input terminal of the differential amplifier 1b.

The steering torque generated by operating the steering wheel (not shown) is detected in terms of the potential change of the potentiometer 1a and the output corresponding to this potential change is generated. The output of the potentiometer 1a is fed to the non-inverted input terminal of the differential amplifier 1b and is compared with a voltage (2.5V) that is half the power source voltage (for example, 5V) from the power source terminal Eo which has been applied to the inverted input terminal. The difference therebetween is amplified and outputted as the steering torque signal Ta.

Figure 9:
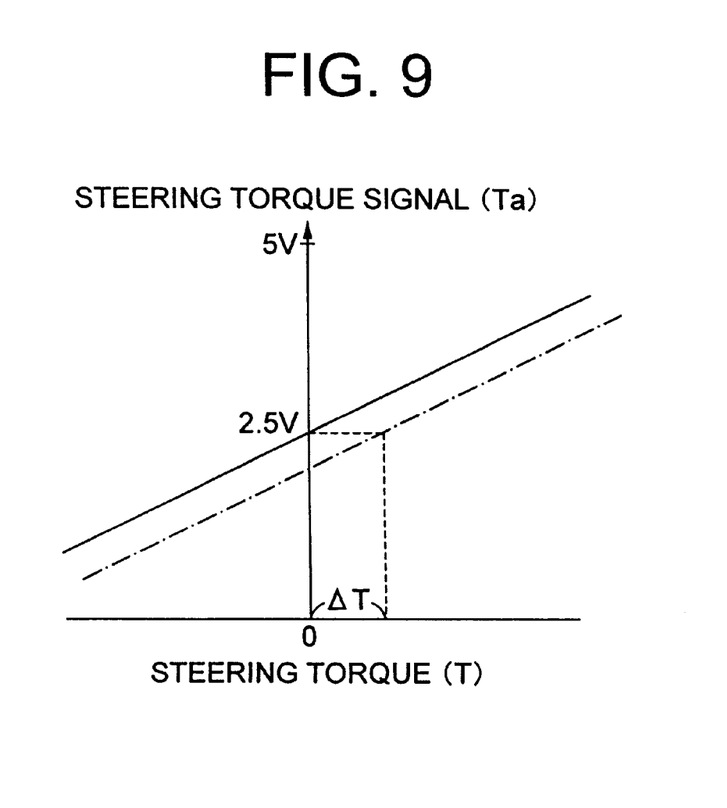
FIG. 9 is a graph showing the characteristics between the steering torque T and the steering torque signal Ta.

FIG. 9 shows characteristics between the steering torque T and the steering torque signal Ta.

In FIG. 9, according to the characteristics the steering torque signal actually shows (indicated by the solid line), the steering torque signal Ta detected by the steering torque detecting means 1 and corresponding to the steering torque T=0 is 2.5V and is increased in a linear fashion from 2.5V to 5V as the steering torque T is increased in a plus (+) direction (for example, in the clockwise direction), whereas the steering torque signal Ta is decreased in a linear fashion from 2.5 V to 0 V as the steering torque T is increased in a minus (−) direction (for example, in the counterclockwise direction).

Accordingly, the steering torque detecting means 1 is so constructed that the torque reference value is set to 2.5 V and the magnitude and the direction of the steering torque is detected as the steering torque signal Ta of from 0 V to 5 V.

Also, FIG. 9 shows an example of the characteristics, indicated by the one-dot-and-dash line, in which the steering torque signal Ta of the torque reference value detected by the steering torque detecting means 1 and corresponding to the steering torque T=0 is offset in a Lower direction from the voltage of 2.5 V. This means that the steering torque T is offset by ΔT in the minus direction (−) (for example, in the counterclockwise direction). When the steering torque T is increased by ΔT in the plus (+) direction (for example, in the clockwise direction), the steering torque signal Ta is detected at 2.5 V.

Incidentally, in the adjustment of the torque reference value of the steering torque detecting means 1, in assembling the electric power steering apparatus, for example, the resistance (variable resistances) of one of the partial resistors 1d and 1e connected to the inverted input terminal of the differential amplifier 1b is adjusted to set the steering torque signal Ta to 2.5 V as the initial setting.

By the way, the above-described conventional power steering apparatus suffers from the following problems.

Namely, the adjustment of the torque reference value of the steering torque detecting means is performed only in assembling work, and thereafter the centering adjustment is not performed. Accordingly, the torque reference value would be changed due to the voltage offset: of the potentiometer that constitutes the steering torque detecting means and the aging change of the differential amplifier, or due to the shift of the adjustable resistance (variable resistance) caused by vibrations or the like, resulting in imbalance in detection of the steering torque. Thus, there is a fear that a driver would feel unsmoothness in steering operation.

Also, depending on the setting of the target value Im and the steering torque T as shown in FIG. 7, there is a fear that the electric motor current might continue to flow while the steering operation is not effected due to the offset of the torque reference value. Accordingly, a non-sensitive zone (neutral zone) $\Delta Tf$ is provided as indicated by the broken line. The neutral zone $\Delta Tf$ has to be broader than the value range in which the torque reference value would be offset. Since this is significantly broad, there is a problem that the operationability would be deteriorated.

SUMMARY OF THE INVENTION

The present invention has been made to solve the above-noted problems, and an object of the present invention is therefore to provide an electric power steering apparatus that is superior in operationability and reliability and is capable of keeping stable steering feeling by automatically compensating the torque reference value even if the characteristics of the steering torque detecting means change.

According to a first aspect of the present invention, there is provided an electric power steering apparatus comprising: a steering torque detecting means for detecting a steering torque to be applied to a steering system of a vehicle; a vehicle velocity detecting means for detecting a vehicle velocity of the vehicle; a curvature radius calculation means for calculating a radius of curvature of a road along which the vehicle travels; a torque reference value storage means for storing a torque reference value of the steering torque; a torque compensation means for compensating the torque reference value of the steering torque on the basis of the steering torque detected by the steering torque detecting means in response to the vehicle velocity detected by the vehicle velocity detecting means and a radius of curvature detected by the curvature radius calculation means; a compensation controlling means for calculating an inferential steering torque on the basis of the torque reference value obtained by the torque compensation means the steering torque detected by the steering torque detecting means; and a target current setting means for setting a target current on the basis of the vehicle velocity detected by the vehicle velocity detecting means and the inferential steering torque.

According to a second aspect of the present invention, in the electric power steering apparatus of the first aspect of the invention, the torque compensation means detects an offset of the torque reference value from: a steering torque obtained by the steering torque detecting means in the case where the vehicle travels along a curve either on the right or left with any desired radius of curvature obtained by the curvature radius calculating means and at any desired vehicle velocity obtained by the velocity detecting means; a steering torque obtained by the steering torque detecting means in the case where the vehicle travels along a curve in the opposite direction to that of the above-described curve with the same radius of curvature as the above-described radius of curvature and at the same velocity as the above-described vehicle velocity; and the differences between the torque reference value and the former steering torque and the differences between the torque reference value and the latter steering torque, to thereby determine a torque compensation value for compensating the torque reference value of the steering torque.

According to a third aspect of the present invention, in the electric power steering apparatus of the second aspect of the invention, the torque compensation means comprises a torque signal storage means for storing the steering torque signal detected by the steering torque detecting means and a torque compensation value setting means for outputting a torque signal reception command to the torque signal storage means when the radius of curvature detected by the curvature radius calculation means and a vehicle velocity detected by the vehicle velocity detecting means are any desired values and for setting a new torque reference value on the basis of the torque reference value from the torque reference storage means and a steering torque signal fed back at that time.

According to a fourth aspect of the present invention, in the electric power steering apparatus of the third aspect of the invention, the torque compensation value setting means comprises a torque compensation allowance judgment means and a torque signal compensation means, the torque compensation allowance judgment means outputting a torque signal reception command to the torque signal storage means when the radius of curvature from the curvature radius calculation means and the vehicle velocity from the vehicle velocity detecting means are any desired values, and sending the steering torque signal fed back at that time to the torque signal compensation means, and the torque signal compensation means receiving the steering torque signals sent from the torque compensation allowance judgment means when the vehicle travels along the right curve and the left curve, comparing the difference between the torque reference value and the right and left steering torque signal, and storing a value obtained by adding half that value to the above torque reference value as a new torque reference value.

According to a fifth aspect of the present invention, in the electric power steering apparatus of the third aspect of the invention, the torque compensation value setting means comprises a storage means and a torque signal compensation means, the storage means storiing the steering torque signals detected by the steering torque detecting means for each representative value of the radius of curvature obtained by the curvature radius calculation means and for each representative value of the vehicle velocity detected by the vehicle velocity detecting means, and the torque signal compensation means extracting only a portion in which the steering torque signals on the right and left sides of the same curvature radius and the same vehicle velocity from the storage means and compensating the torque reference value according to an average value of all errors between the steering torque signals and the torque reference value.

According to a sixth aspect of the invention, the electric power steering apparatus of the first aspect of the invention further comprises a torque reference value determining means for compensating the torque reference value, obtained by the torque compensation means, only when the vehicle velocity detected by the vehicle velocity detecting means is lower than a desired value.

DESCRIPTION OF THE PREFERRED EMBODIMENTS

An embodiment of the present invention will now be described with reference to the accompanying drawings.

First Embodiment

Figure 1:
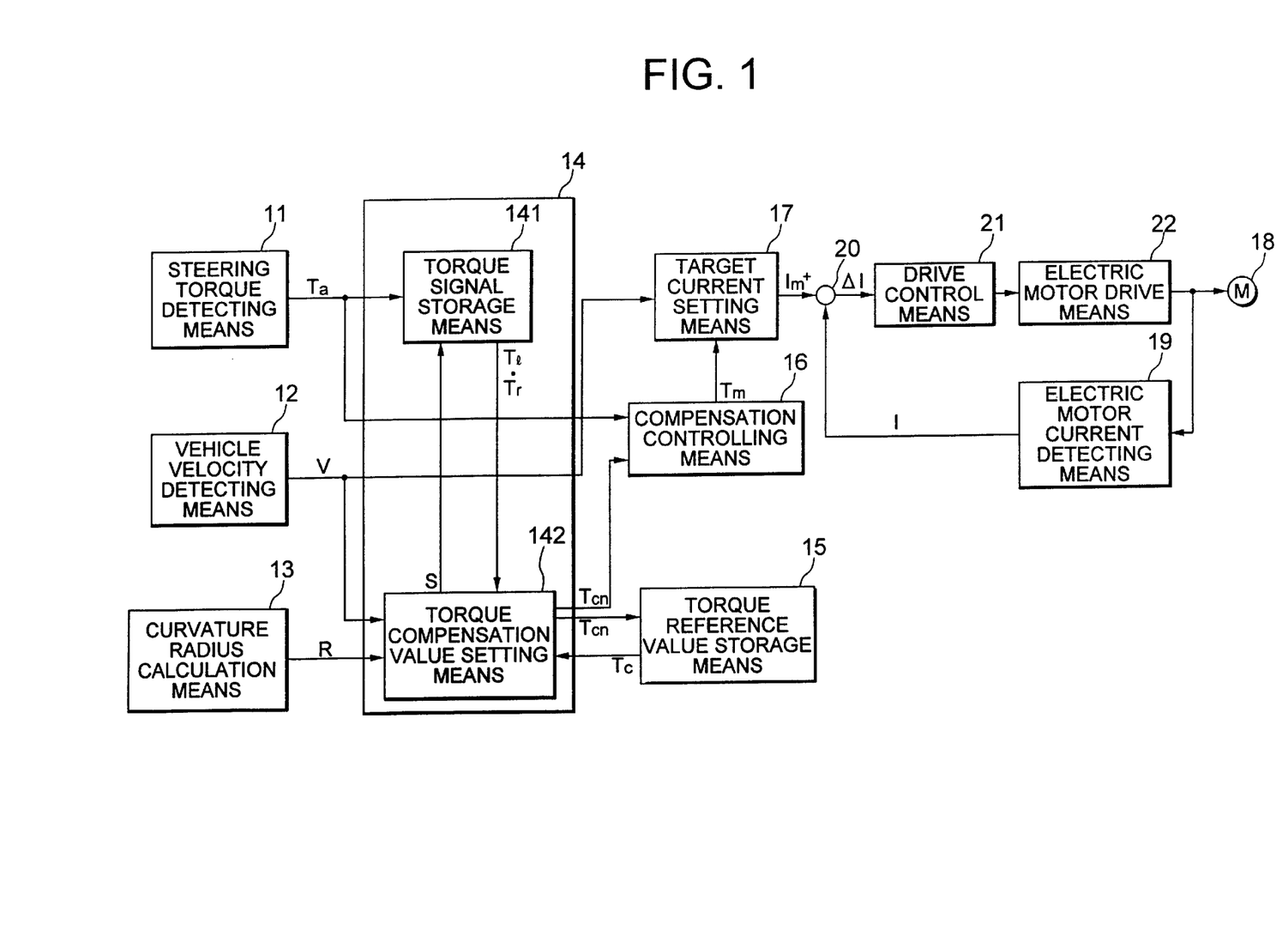
FIG. 1 is a structural diagram showing a first embodiment of the present invention.

FIG. 1 is a structural diagram showing an electric power steering apparatus in accordance with a first embodiment of the present invention.

In FIG. 1, the electric power steering apparatus is provided with a steering torque detecting means 11 for detecting a steering torque to be applied to a steering system of a vehicle, a vehicle velocity detecting means 12 for detecting a velocity of the vehicle, a curvature radius calculating means 13 having memories such as ROM and RAM, calculation functions and the like and calculating a radius of curvature of a road along which the vehicle travels, a torque compensation means 14 including a torque signal storage means 141 and a torque compensation value setting means 142 to be described later, a torque reference value storage means 15 for storing the torque reference value of the steering torque, a compensation controlling means 16 having memories such as ROM and RAM, calculation functions and the like and calculating an inferential steering torque in accordance with the torque reference value obtained by the torque compensation means 14 and the steering torque signal obtained by the steering torque detecting means 11, and a target current setting means 17 similarly having memories such as ROM and RIM, calculation functions and the like and setting the target current in accordance with the inferential steering torque and the vehicle velocity obtained by the vehicle velocity detecting means 12.

Also, the electric power steering apparatus is provided with an electric motor 18 for applying the steering assist power to the steering system, an electric motor current detecting means 19 for detecting the current that flows through the electric motor 18, a deviation determining means 20 for calculating a deviation signal between the target current from the target current setting means 17 and the electric motor current detected by the electric motor current detecting means 19, and a drive controlling means 21 for converting the deviation signal from the deviation determining means 20 into a voltage and PWM controlling an electric motor drive means 22 to generate the electric motor controlling voltage that quickly converges the deviation signal into zero.

The torque compensation means 14 detects the offset of the torque reference value from: a steering torque signal obtained by the steering torque detecting means 11 in the case where the vehicle travels along a curve either on the right or left with any desired radius of curvature obtained by the curvature radius calculating means 13 and at any desired vehicle velocity obtained by the velocity detecting means 12; a steering torque signal obtained by the steering torque detecting means 11 in the case where the vehicle travels along a curve in the opposite direction to that of the above-described curve with the same radius of curvature as the above-described radius of curvature and at the same velocity as that of the above-described vehicle velocity; and the difference between the torque reference value and the former steering torque and the difference between the torque reference value and the latter steering torque. The torque compensation means 14 compensates the torque reference value of the above-described steering torque signals using the detected offset.

Figure 2:
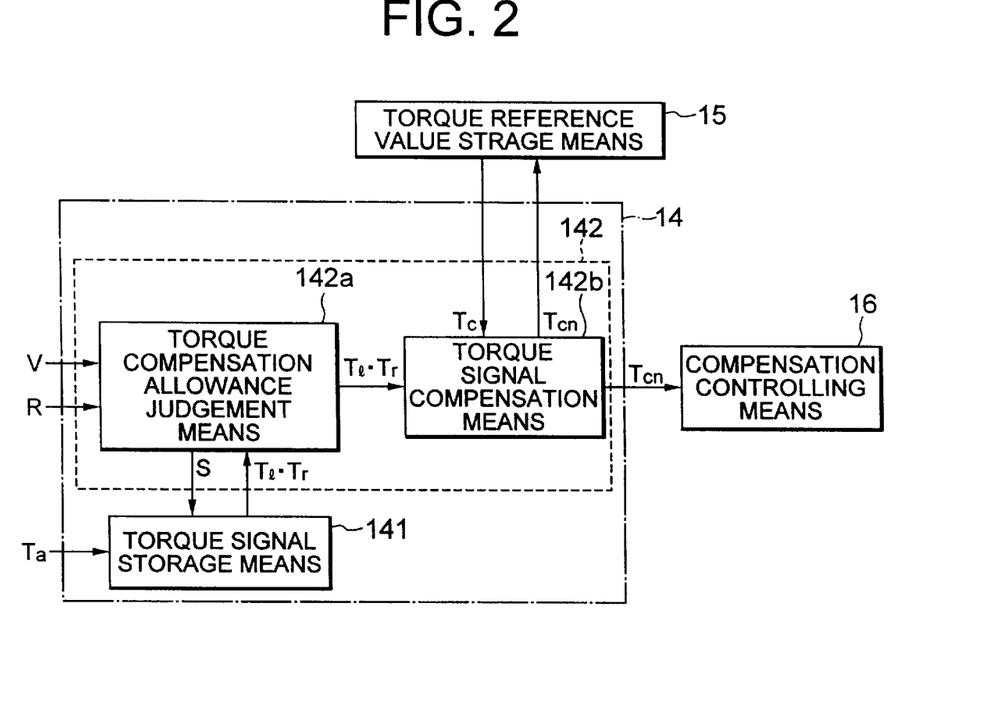
FIG. 2 is a structural diagram showing a primary part of the first embodiment of the present invention.

FIG. 2 shows an example of a specific circuit construction of the torque compensation means 14. The latter 14 is provided with the torque signal storage means 141 and the torque compensation value setting means 142. The torque signal storage means 141 is provided with memories such as ROM and RAM. When a torque signal entraining command is outputted from the torque compensation value setting means 142, the steering torque signal outputted from the steering torque detecting means 11 is fed back to the torque compensation value setting means 142.

The torque compensation value setting means 142 is provided with a torque compensation allowance judgment means 142a and a torque signal compensation means 142b. The torque compensation allowance judgment means 142a is provided with memories such as ROM and RAM, judgment functions and the like, outputs the torque signal reception command to the torque signal storage means 141 when a radius of curvature to be inputted from the curvature radius calculating means 13 and the vehicle velocity to be inputted from the vehicle velocity detecting means 11 are any desired values, and sends the steering torque signal fed back at that time to the torque signal compensation means 142b.

The torque signal compensation means 142b is provided with memories such as ROM and RAM, judgment function, calculation functions and the like, receives the steering torque signals sent from the torque compensation allowance judgment means 142a when the vehicle travels along the right curve and left curve, compares the difference between the steering torque signal on the right and left curves and stores a value obtained by adding half that value and the torque reference value in the torque reference value storage means 15 as a new torque reference value.

The operation will now be described.

The curvature radius calculating means 13 calculates the radius of curvature at which the vehicle is traveling from, for example, the vehicle velocity and the wheel speed on the right and left sides.

Figure 3:
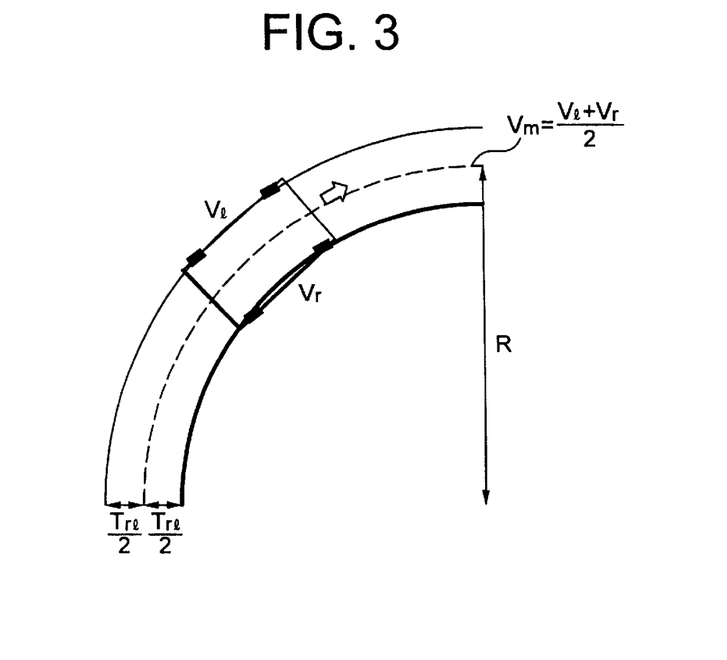
FIG. 3 is a schematic view showing the state in which a vehicle is traveling along the radius of curvature R.

Now, when the vehicle travels along a true circle, the time to be spent for one circle is given from FIG. 3:

$$2\pi\{R-(T_{re}/2)\}/V_l = 2\pi\{R+(T_{re}/2)\}/V_r$$

The radius is calculated from the above equation as follows:

$$V_r\{R-(T_{re}/2)\}=V_1\{R+(T_{re}/2)\}$$

$$R(V_r-V_1)=(T_{re}/2)\cdot(V_r+V_1)$$

$$R=\{(T_{re}/2)\cdot(V_r+V_1)\}/(V_r-V_1)$$

$$R=(T_{re}\times V_m)/W_d$$

where R is the radius of curvature along which the vehicle travels, $T_{re}$ is a tread (vehicle width) (constant), Vr is the wheel speed on the right, Vl is the wheel speed on the left, Vm is the average wheel speed $\{(V1+Vr)/2\}$, i.e., the vehicle velocity, and Wd is the difference in wheel speed (Vr−Vl).

Thus, the radius of curvature R obtained by the curvature radius calculation means 13 is fed to the torque compensation value setting means 142 of the torque compensation means 14.

Incidentally, in the above-described case, the right and left wheel speeds are used for the purpose of calculating the radius of curvature. However, for example, the signal output from the gravitational acceleration sensor (not shown) together with the vehicle velocity may be used to calculate the radius of curvature as follows:

$$F = mr\omega^2$$
$$= m(v^2/r)$$
$$r = m(v^2/F)$$

where F is the centrifugal force when the vehicle moves along the curve (gravitational acceleration sensor output value), v is the vehicle velocity, m is the mass of vehicle (constant), r is the radius of curvature and ω is an angular velocity (v/r).

The torque signal storage means 141 of the torque compensation means 14 sends the steering torque signal Ta outputted from the steering torque detecting means 11 to the torque compensation value setting means 142 as the steering torque signal Tl in turning left and as the steering torque signal Tr in turning right when the torque signal reception command S is outputted from the torque compensation value setting means 142.

The torque compensation allowance judgment means 142a of the torque compensation value setting means 142 outputs the torque signal reception command S to the torque signal storage means 141 when the vehicle velocity V to be inputted by the vehicle velocity detecting means 12 and the radius of curvature R to be inputted by the curvature radius calculation means are any desired values and sends the steering signals Tl and Tr fed back at this time to the torque signal compensation means 142b.

The torque signal compensation means 142b receives as the steering torque signal Tl the steering torque signal Ta sent from the torque compensation allowance judgment means 142a when the vehicle is traveling along the left curve, for example, and receives as the steering torque signal Tr the steering torque signal Ta sent from the compensation allowance judgment means 142a when the vehicle is traveling along the right curve. Then, the difference (ΔTl=|Tc− Tl|), ΔTr=|Tc−Tr|) between the obtained torque signal (Tl·Tr) and the torque reference value Tc is set as the steering torque, and the right and left values of the steering torques are compared with each other (ΔTc=ΔTr−ΔTl), and the one obtained by adding half that value to the torque reference value is used as a new torque reference value (Tcn=Tc+ (ΔTc/2)).

Thus, the steering feeling is kept constant when the vehicle is traveling at the same velocity along the same curvature on both right and left sides. The new torque reference value Tcn is stored in the reference value storage means 15. Also, the new torque reference value Tcn is fed to the next step, i.e., the compensation controlling means 16 as the compensated torque reference value.

Incidentally, before the torque reference value is changed by the torque signal compensation means 142b, the torque reference value read by the torque reference value storage means 15 is used as a current torque reference value Tc.

Also, in the foregoing example, the differences between the steering torque signals (Tl·Tr) on the left and right sides and the torque reference value Tc are obtained each time to calculate the steering torque and to calculate the torque reference value Tcn. However, it is possible to calculate the new torque reference value (Tcn=(Tl+Tr)/2) from the average value of the obtained steering torque signals (Tl·Tr). Thus, the calculation may be simplified.

Subsequently, the compensation controlling means 16 calculates the inferential steering torque Tm from the torque reference value Tcn compensated by and sent from the torque signal compensation means 142b and the steering torque signal Ta detected by the steering torque detecting means 11, and outputs the torque Tm to the target current setting means 17.

The target current setting means 17 determines the target current Im from the characteristic relationship between the target current Im and the steering torque T indicated by the one-dot-and-dash line in FIG. 7 on the basis of the vehicle velocity V detected by the vehicle velocity detecting means 12 and the inferential steering torque Tm outputted from the compensation controlling means 16, and outputs the target current Im to the deviation determining means 20. In this case, since the torque reference value is compensated with high precision as described above, the characteristic relationship between the target current Im and the steering torque T may be set as indicated by the one-dot-and-dash line in FIG. 7. At this time, it is possible to narrow the neutral zone ΔTfl in comparison with the conventional neutral zone ΔTf. This makes it possible to enhance the operationability.

The deviation determining means 20 obtains the deviation signal ΔI of the current I that flows the electric motor 18 and is detected by the electric motor current detecting means 19 and the target current Im from the target current setting means 17, and feeds the signal ΔI to the drive controlling means 21.

The drive control means 21 converts the deviation signal ΔI into a voltage signal and generates the electric motor controlling voltage V0 so that the deviation signal ΔI is quickly converged into zero, to thereby PWM control the electric motor drive means 22 and to drive the electric motor 18.

Thus, in this embodiment, the steering torque signal, the vehicle velocity and the radius of curvature of the road along which the vehicle is traveling are detected, the steering torque in left steering and the steering torque in the right steering are compared with each other when the vehicle and the radius of curvature are certain values, and the torque reference value is corrected to eliminate the difference if any between the right and left steering torques. It is therefore possible to provide an electric power steering apparatus that is superior in operationability and reliability and is capable of keeping stable steering feeling by automatically compensating the offset of the torque reference value due to the aging change of the differential trance and the differential amplifier, or due to the shift of the adjustable resistance (variable resistance) caused by vibrations or the like.

Second Embodiment

Figure 4:
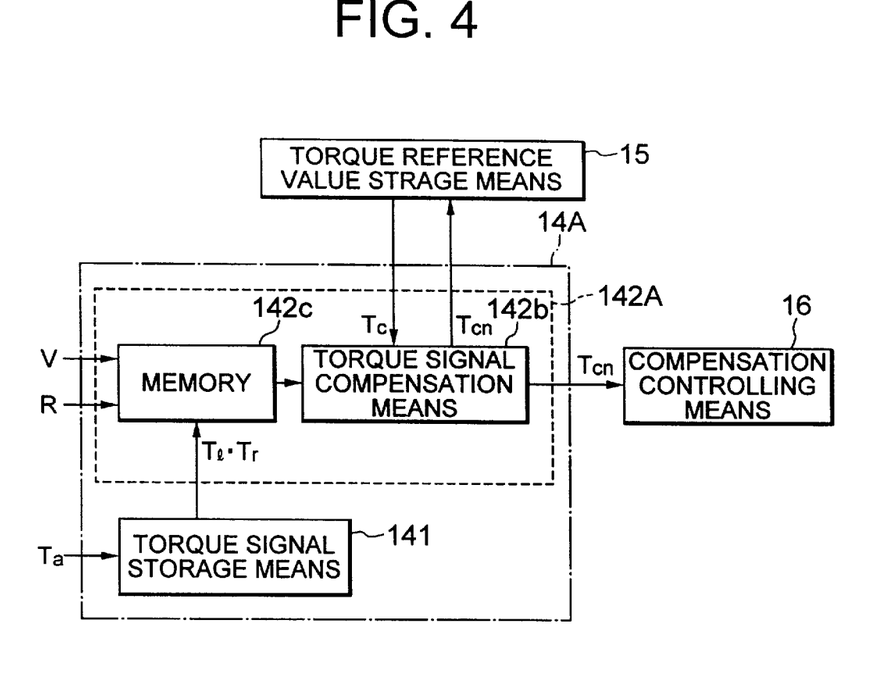
FIG. 4 is a structural diagram showing a primary part of a second embodiment of the present invention.

FIG. 4 is a diagram showing a primary part of an electric power steering apparatus in accordance with a second embodiment of the present invention. Incidentally, the components in FIG. 4 has the same structure as the components in the above-described embodiment 1 except for a torque compensation means 14A.

In FIG. 4, the torque compensation means 14A is provided with a torque signal storage means 141 similar to the one the torque compensation means 14 shown in FIG. 2 has, and at the same time provided with the torque compensation value setting means 142A. This torque compensation value setting means 142A is provided with a storage means 142c and a torque signal compensation means 142b.

The storage means 142c is provided with memories such as ROM and RAM and stores the steering torque signal Ta sent from the torque signal storage means 141 as the steering torque signals Tl and Tr respectively corresponding to the vehicle velocity V inputted by the vehicle speed detecting means 12 (see FIG. 1) and the radius of curvature R inputted by the curvature radius calculation means 13 (see FIG. 1).

The torque signal compensation means 142b is provided with memories such as ROM and RAM, judgment function, calculation function and the like, and calculates the torque reference value in the same manner as in the first embodiment with respect to all the steering torque signals on both right and left sides of the same vehicle velocity and the same radius of curvature which are stored in the storage means 142c to obtain the average value on all the torque reference values. Thus, even if disturbance such as an external noise is introduced into the system, it is possible to suppress the adverse affect thereof and to determine the torque reference value with higher accuracy.

Thus, in this embodiment, the steering torque signals respectively corresponding to the vehicle velocity and radius of curvature at a desired representative value of the vehicle velocity and a desired representative value of the radius of curvature are stored, and all the steering torque signals storing on both right and left sides of the same radius of curvature and the same vehicle velocity are used. Accordingly, even if disturbance such as an external noise is introduced into the system, it is possible to suppress the adverse affect thereof to determine the torque reference value with high accuracy and to enhance the reliability.

Third Embodiment

Figure 5:
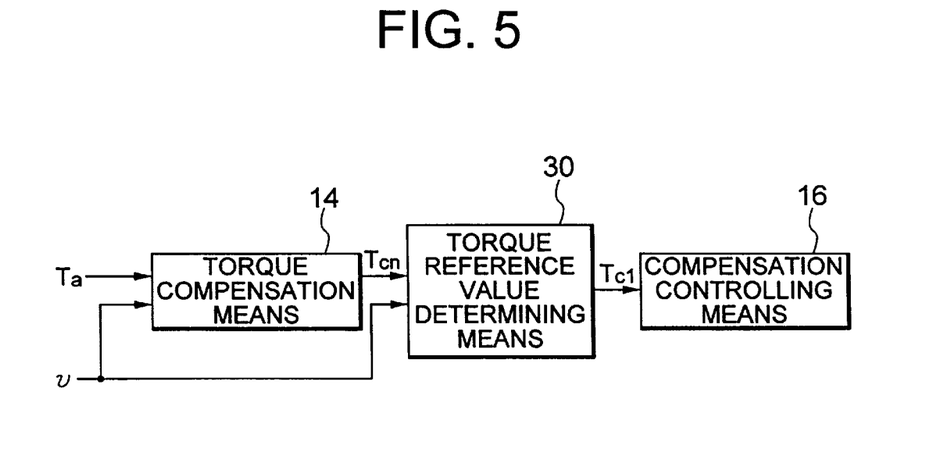
FIG. 5 is a structural diagram showing a primary part of a third embodiment of the present invention.

FIG. 5 is a structural diagram showing a primary part of an electric power steering apparatus in accordance with a third embodiment of the present invention. Incidentally, in this embodiment, a torque reference value determining means 30 is provided between the torque compensation means 14 and the compensation controlling means 16. The rest of the structure is the same as that of the first embodiment.

In FIG. 5, the torque reference value determining means 30 is provided with memories such as ROM and RAM, the calculation function and the like, outputs the hitherto torque reference value Tcl to the compensation controlling means 16 as the torque reference value without changing the torque reference value when the vehicle velocity obtained by the vehicle velocity detecting means 12 (FIG. 1) exceeds a desired value even if the torque reference value Tcn is outputted from the torque compensation means 14, and outputs as the current torque reference value Tcl the torque reference value Tcn outputted from the torque compensation means 14 in the case where the vehicle velocity obtained by the vehicle velocity detecting means 12 is equal or less than the desired value. Thus, the torque reference value is compensated in low speed driving or while parking to thereby make it possible to compensate the torque reference value more positively.

Thus, according to this embodiment, since the target current is changed by compensating the torque reference value in high speed driving, in order to avoid the resultant change in the amount of assist power to the steering wheel and in the behavior of the vehicle, the torque reference value is compensated in low speed driving or while parking, whereby it is possible to compensate the torque reference value more positively.

What is claimed is:

1. An electric power steering apparatus comprising:
   a steering torque detecting means for detecting a steering torque to be applied to a steering system of a vehicle;
   a vehicle velocity detecting means for detecting a vehicle velocity of the vehicle;
   a curvature radius calculation means for calculating a radius of curvature of a road along which the vehicle travels;
   a torque reference value storage means for storing a torque reference value or the steering torque;
   a torque compensation means for compensating the torque reference value of the steering torque on the basis of the steering torque detected by said steering torque detecting means in response to the vehicle velocity detected by said vehicle velocity detecting means and a radius of curvature detected by said curvature radius calculation means;
   a compensation controlling means for calculating an inferential steering torque on the basis of the torque reference value obtained by said torque compensation means and the steering torque detected by said steering torque detecting means; and
   a target current setting means for setting a target current on the basis of the vehicle velocity detected by said vehicle velocity detecting means and the inferential steering torque.

2. The electric power steering apparatus according to claim 1, wherein said torque compensation means detects an offset of the torque reference value from: a steering torque obtained by said steering torque detecting means in the case where the vehicle travels along a curve either on the right and left with any desired radius of curvature obtained by said curvature radius calculating means and at any desired vehicle velocity obtained by said velocity detecting means; a steering torque obtained by said steering torque detecting means in the case where the vehicle travels along a curve in the opposite direction to that of the above-described curve with the same radius of curvature as the above-described radius of curvature and at the same velocity as the above-described vehicle velocity; and the difference between the torque reference value and the former steering torque and the difference between the torque reference value and the latter steering torque, and compensates the torque reference value of the steering torque.

3. The electric power steering apparatus according to claim 2, wherein said torque compensation means comprises a torque signal storage means for storing the steering torque signal detected by said steering torque detecting means and a torque compensation value setting means for outputting a torque signal reception command to said torque signal storage means when the radius of curvature detected by said curvature radius calculation means and a vehicle velocity detected by said vehicle velocity detecting means are any desired values and for setting a new torque reference value on the basis of the torque reference value from said torque reference value storage means and a steering torque signal fed back at that time.

4. The electric power steering apparatus according to claim 3, wherein said torque compensation value setting means comprises a torque compensation allowance judgment means and a torque signal compensation means, said torque compensation allowance judgment means outputting a torque signal reception command to said torque signal storage means when the radius of curvature from said curvature radius calculation means and the vehicle velocity from said vehicle velocity detecting means are any desired values, and sending the steering torque signal fed back at that time to said torque signal compensation means, and said torque signal compensation means receiving the steering torque signal sent from said torque compensation allowance judgment means when the vehicle travels along the right curve and the left curve, comparing the difference between the torque reference value and the right and left steering torque signals, and storing a value obtained by adding half that value to the torque reference value in said torque reference value storage means as a new torque reference value.

5. The electric power steering apparatus according to claim 3, wherein said torque compensation value setting means comprises a storage means and a torque signal compensation means, said storage means storing the steering torque signals detected by said steering torque detecting means for each representative value of the radius of curvature obtained by said curvature radius calculation means and for each representative value of the vehicle velocity detected by said vehicle velocity detecting means, and said torque signal compensation means extracting only a portion in which the steering torque signals on the right and left sides of the same curvature radius and the same vehicle velocity from said storage means and compensating the torque reference value according to an average value of all errors between the steering torque signals and the torque reference value.

6. The electric power steering apparatus according to claim 1, further comprising a torque reference value determining means for compensating the torque reference value, obtained by said torque compensation means, only when the vehicle velocity detected by said vehicle velocity detecting means is lower than a desired value.

* * * * *